US009806643B2

United States Patent
Oyama et al.

(10) Patent No.: US 9,806,643 B2
(45) Date of Patent: Oct. 31, 2017

(54) DRIVE CONTROL APPARATUS FOR ELECTRIC MOTOR

(71) Applicant: HITACHI AUTOMOTIVE SYSTEMS, LTD., Hitachinaka-shi, Ibaraki (JP)

(72) Inventors: Toshiaki Oyama, Isesaki (JP); Tomonobu Koseki, Isesaki (JP); Tomishige Yatsugi, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/909,607

(22) PCT Filed: Mar. 17, 2014

(86) PCT No.: PCT/JP2014/057093
§ 371 (c)(1),
(2) Date: Feb. 2, 2016

(87) PCT Pub. No.: WO2015/019652
PCT Pub. Date: Feb. 12, 2015

(65) Prior Publication Data
US 2016/0181953 A1    Jun. 23, 2016

(30) Foreign Application Priority Data

Aug. 5, 2013   (JP) .................................. 2013-162817

(51) Int. Cl.
*H02P 3/06*      (2006.01)
*H02P 29/02*     (2016.01)
(Continued)

(52) U.S. Cl.
CPC ................ *H02P 3/06* (2013.01); *B62D 5/046* (2013.01); *B62D 5/0487* (2013.01); *G05B 15/02* (2013.01);
(Continued)

(58) Field of Classification Search
CPC .. H02P 3/06; H02P 27/02; H02P 29/02; H02P 6/14; H02H 7/08; B62D 5/04; G05B 15/02
See application file for complete search history.

(56) References Cited

U.S. PATENT DOCUMENTS 6,087,877 A *  7/2000  Gonda ..................... H03K 5/08
                                                    327/110
6,373,731 B1 *  4/2002  Iwamura ................. H02M 1/34
                                                    361/91.1
(Continued)

FOREIGN PATENT DOCUMENTS

JP       07-288456 A     10/1995
JP       2002-238287 A    8/2002
(Continued)

OTHER PUBLICATIONS

Japanese Office Action and English Translation issued in corresponding application No. 2013-162817 dated Nov. 29, 2016.

Primary Examiner — Eduardo Colon Santana
Assistant Examiner — Said Bouziane
(74) Attorney, Agent, or Firm — Foley & Lardner LLP

(57) ABSTRACT

The present invention relates to a drive control apparatus for an electric motor and a control method thereof. In the present invention, the generation of electric brake is suppressed while protecting a semiconductor relay from excessive surge voltage. The drive control apparatus is configured to include: a drive circuit for controlling the drive of the electric motor; a semiconductor relay arranged on a drive line between the drive circuit and the electric motor to cut off current supply from the drive circuit to the electric motor; and an active clamp circuit for turning on the semiconductor relay when a potential difference between the drive circuit (Continued)

side and the electric motor side of the semiconductor relay is greater than or equal to a predetermined value.

15 Claims, 8 Drawing Sheets

(51) Int. Cl.
| | |
|---|---|
| G05B 15/02 | (2006.01) |
| B62D 5/04 | (2006.01) |
| H02H 7/122 | (2006.01) |
| H02H 7/20 | (2006.01) |
| H02H 7/08 | (2006.01) |
| H02P 6/14 | (2016.01) |
| H02P 29/024 | (2016.01) |
| H02P 27/06 | (2006.01) |

(52) U.S. Cl.
CPC ........ *H02H 7/0833* (2013.01); *H02H 7/1227* (2013.01); *H02H 7/20* (2013.01); *H02P 6/14* (2013.01); *H02P 29/02* (2013.01); *H02P 29/0241* (2016.02); *H02P 27/06* (2013.01)

(56) References Cited

U.S. PATENT DOCUMENTS

| | | | | |
|---|---|---|---|---|
| 8,499,885 | B1* | 8/2013 | Satou | H02P 6/12 180/443 |
| 2001/0028572 | A1* | 10/2001 | Takanashi | H02M 1/08 363/58 |
| 2010/0270958 | A1 | 10/2010 | Tsuboi et al. | |
| 2011/0066332 | A1* | 3/2011 | Sonoda | B62D 5/0406 701/42 |
| 2011/0156626 | A1* | 6/2011 | Mukai | B62D 5/0487 318/400.21 |
| 2011/0285335 | A1* | 11/2011 | Tada | H02H 7/0844 318/400.22 |
| 2013/0033909 | A1* | 2/2013 | Jones | H03K 17/0812 363/56.01 |
| 2014/0266323 | A1* | 9/2014 | McIntosh | H02M 1/08 327/109 |

FOREIGN PATENT DOCUMENTS

| | | |
|---|---|---|
| JP | 2010-254128 A | 11/2010 |
| JP | 2011-244611 A | 12/2011 |
| JP | 2013-026769 A | 2/2013 |
| WO | WO-2010/007672 A1 | 1/2010 |

\* cited by examiner

DRIVE CONTROL APPARATUS FOR ELECTRIC MOTOR

TECHNICAL FIELD

The present invention relates to a drive control apparatus for an electric motor.

BACKGROUND ART

Conventionally, a phase cutoff relay (phase relay) has been provided between a motor drive circuit and an electric motor to suppress the generation of electric brake in the electric motor, for example, due to the failure of an inverter circuit or the like. When a semiconductor relay using a semiconductor device such as a MOSFET is employed for this phase relay, it is possible to make the product small and to increase the reliability thereof. However, since the semiconductor relay is largely limited by the withstand voltage, it is necessary to protect the semiconductor relay from surge voltage generated due to the inductance of the electric motor at the time of phase cutoff.

Therefore, for example, in Patent Document 1, a resistor is connected in parallel with a semiconductor relay to protect the semiconductor relay. When current is passed through the resistor in a state in which the semiconductor relay is turned off, it is possible to reduce a difference in potential applied to the semiconductor relay so as not to exceed the withstand voltage.

REFERENCE DOCUMENT LIST

Patent Document

Patent Document 1: Japanese Patent Application Laid-open Publication No. 2002-238287

SUMMARY OF THE INVENTION

Problem to be Solved by the Invention

However, the resistance value of the resistor needs to be reduced in order to protect the semiconductor relay from high surge voltage using the technique in Patent Document 1. When the resistance value is reduced, the impedance of a closed loop as a factor of electric brake is decreased, and this lowers or impairs the original function of the phase relay to suppress the generation of electric brake. For this reason, it is difficult to satisfy both protection from excessive surge voltage and suppression of electric brake.

The present invention has been made in view of the above problems, and it is an object thereof to provide a drive control apparatus for an electric motor capable of suppressing the generation of electric brake while protecting a semiconductor relay from excessive surge voltage.

Means for Solving the Problem

Therefore, the drive control apparatus of the present invention is configured to include: a drive circuit for controlling the drive of an electric motor; a first phase cutoff semiconductor relay arranged for each phase on a drive line between the drive circuit and the electric motor to cut off current supply from the drive circuit to the electric motor; a first driver for driving the first semiconductor relay for each phase of the electric motor or simultaneously driving the first semiconductor relay for the phases to perform phase cutoff; and a first active clamp circuit for turning on the first semiconductor relay when the electric motor is rotated by an external force in a phase-cutoff state of the first semiconductor relay by the first driver and a potential difference between the drive circuit side and the electric motor side of the first semiconductor relay is greater than or equal to a predetermined value.

Effects of the Invention

According to the present invention, if excessive negative surge voltage is generated when a failure leading to electric brake is detected to turn off the first semiconductor relay, it is possible to turn on the first semiconductor relay by the first active clamp circuit to suppress the surge voltage from being applied to the first semiconductor relay to thereby protect the first semiconductor relay. Thus, it is possible to suppress the generation of electric brake while protecting the first semiconductor relay from excessive surge voltage.

MODES FOR CARRYING OUT THE INVENTION

Embodiments of the present invention will be described below with reference to the accompanying drawings.

In the embodiments, an electric power steering apparatus will be described as an example of a drive control apparatus for an electric motor.

Figure 1:
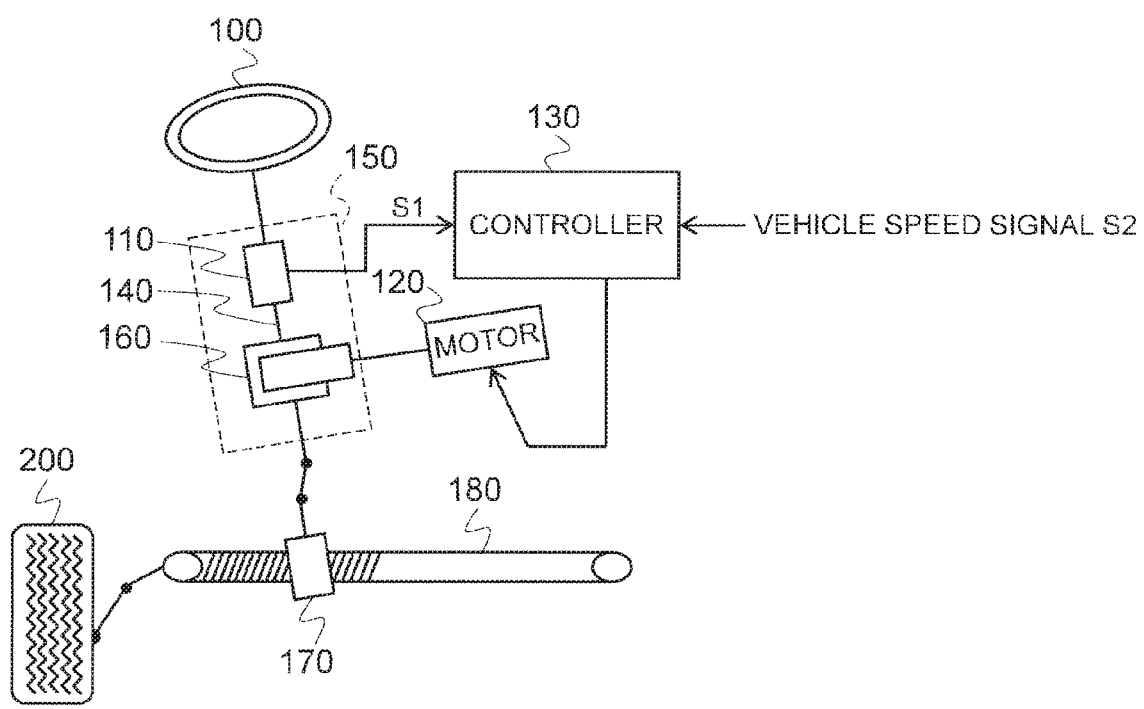
FIG. 1 is a schematic configuration diagram of an electric power steering apparatus.

As illustrated in FIG. 1, the electric power steering apparatus, a so-called EPS (Electric Power Steering) system, is configured to include a steering wheel 100, a steering torque detecting sensor 110, an assist motor 120, a controller 130, and the like. Inside a steering column 150 including a steering shaft 140, steering torque detecting sensor 110 mentioned above and a speed reducer 160 are provided.

Then, when a driver of a vehicle performs a steering operation, a steering torque generated in steering shaft 140 is detected by steering torque detecting sensor 110. Based on this steering torque signal S1, a vehicle speed signal S2, and the like, assist motor 120 is driven by controller 130 to generate a steering assist force from assist motor 120 according to a traveling state. Thus, when a pinion gear 170 provided at the tip of steering shaft 140 is rotated, a rack shaft 180 moves horizontally from side to side in a traveling direction to transmit the driver's steering operation to wheels (tires) 200 so as to turn the vehicle around.

First Embodiment

Figure 2:
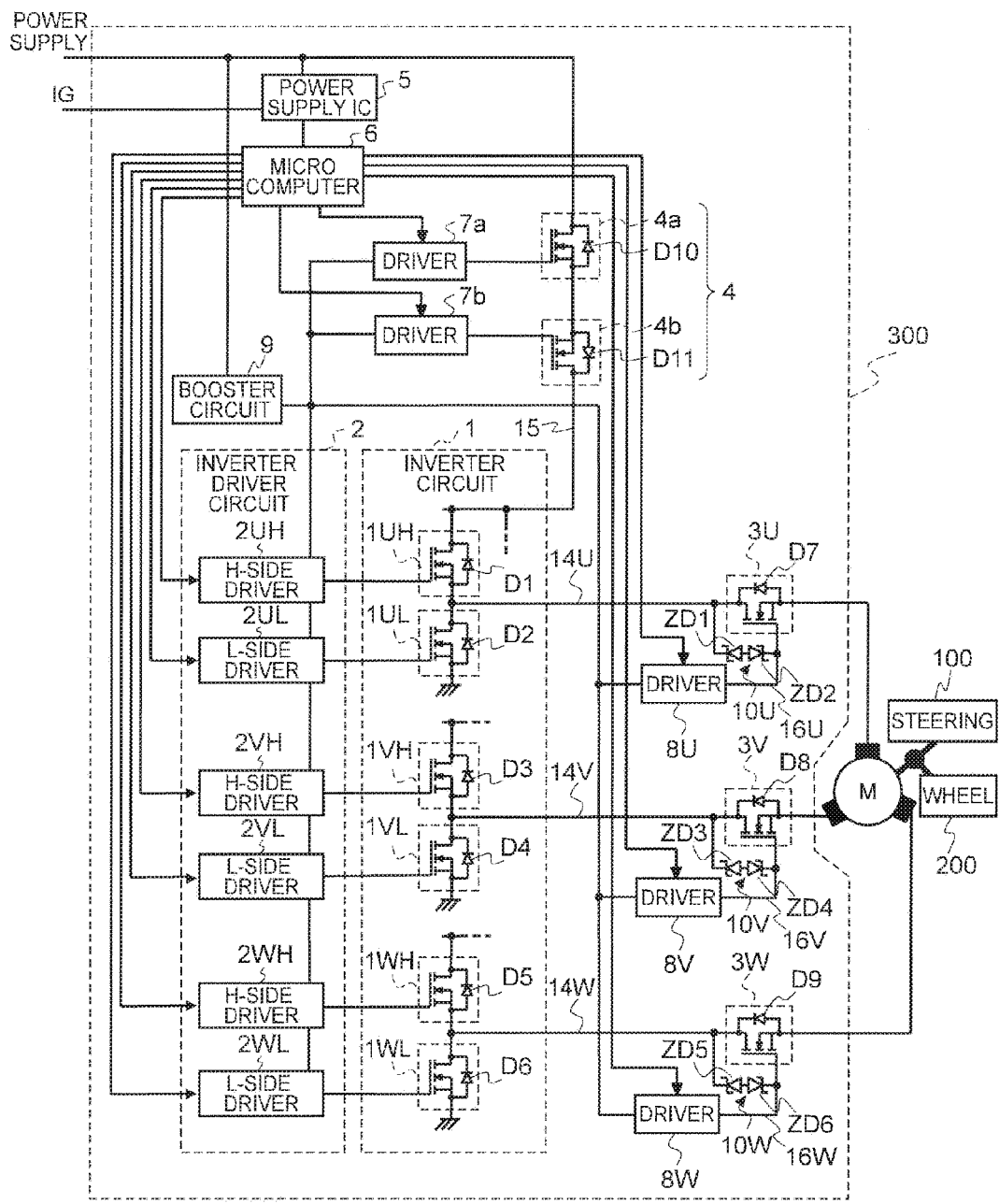
FIG. 2 is a circuit diagram illustrating a drive control apparatus for an electric motor according to a first embodiment of the present invention.

Next, the circuit configuration of an electric power steering controller according to a first embodiment of the present invention will be described with reference to FIG. 2. In FIG. 2, the assist motor in the EPS system illustrated in FIG. 1 is controlled by a control unit as the controller. Assist motor 120 and controller 130 in FIG. 1 are made to correspond to an electric motor M and a control unit 300, respectively, to supply steering torque signal S1, vehicle speed signal S2, and the like to a microcomputer 6 in control unit 300 (not illustrated). Then, electric motor M is driven by microcomputer 6 via an inverter driver circuit 2 serving as a drive circuit and an inverter circuit 1 to generate a steering assist force according to a traveling state.

Control unit 300 is configured to further include phase relays 3U, 3V, 3W, power supply relays 4 (a powering cutoff relay 4a and a regeneration cutoff relay 4b), a power supply IC 5, drivers 7a, 7b of a discrete structure for the power supply relays, drivers 8U, 8V, 8W of a discrete structure for phase relays 3U, 3V, 3W, a booster circuit 9, active clamp circuits 10U, 10V, 10W, and the like.

Power supply IC 5 supplies an operating power to microcomputer 6 based on power-supply voltage supplied from a power supply such as a battery. The power-supply voltage is also supplied from the battery to booster circuit 9, and this power-supply voltage is boosted to generate boosted voltage.

Based on control by microcomputer 6, driver 7a supplies, to powering cutoff relay (semiconductor relay) 4a, a control signal of a voltage level boosted by booster circuit 9 to perform on and off control. Similarly, based on control by microcomputer 6, driver 7b supplies, to regeneration cutoff relay (semiconductor relay) 4b, the control signal of the voltage level boosted by booster circuit 9 to perform on and off control.

Power supply relays 4 (powering cutoff relay 4a and regeneration cutoff relay 4b) are made up of N-channel MOSFETs. In these MOSFETs, a drain-source current path and a source-drain current path are connected in series to supply an operating power from the battery to inverter circuit 1 through a power supply line 15. Furthermore, in these MOSFETs, diodes D10, D11 connected in the forward direction between the source and the drain are parasitic diodes.

Inverter circuit 1 has a three-phase bridge circuit configuration including three pairs of semiconductor devices for driving each phases of the U-phase, V-phase, and W-phase of electric motor M through drive lines 14U, 14V, 14W, respectively. In this example, each semiconductor device is made up of each of N-channel MOSFETs 1UH, 1UL, 1VH, 1VL, 1WH, and 1WL.

Drain-source current paths of MOSFETs 1UH and 1UL are connected in series between power supply line 15 and a ground point, and one end of drive line 14U mentioned above is connected to a common connection point. Drain-source current paths of MOSFETs 1VH and 1VL are connected in series between power supply line 15 and the ground point, and one end of drive line 14V mentioned above is connected to a common connection point. Furthermore, drain-source current paths of MOSFETs 1WH and 1WL are connected in series between power supply line 15 and the ground point, and one end of drive line 14W mentioned above is connected to a common connection point.

In each of MOSFETs 1UH, 1UL, 1VH, 1VL, 1WH, 1WL, each of diodes D1 to D6 connected between the source and the drain in the forward direction is a parasitic diode.

Inverter driver circuit 2 includes: H-side drivers 2UH, 2VH, 2WH respectively corresponding to MOSFETs 1UH, 1VH, 1WH which are upstream-side drive devices (upper arms); and L-side drivers 2UL, 2VL, 2WL respectively corresponding to MOSFETs 1UL, 1VL, 1WL which are downstream-side drive devices (lower arms) in inverter circuit 1. The power-supply voltage boosted by booster circuit 9 is supplied to these H-side driver 2UH, 2VH, 2WH and L-side driver 2UL, 2VL, 2WL, and controlled by microcomputer 6. The gate of each of MOSFETs 1UH, 1VH, 1WH is connected to an output terminal of each of H-side drivers 2UH, 2VH, 2WH, respectively, so that on and off thereof is controlled selectively. The gate of each of MOSFETs 1 UL, 1VL, 1WL is connected to an output terminal of each of L-side drivers 2UL, 2VL, 2WL, respectively, so that on and off thereof is controlled selectively.

Phase relays (first semiconductor relays) 3U, 3V, 3W are provided between inverter circuit 1 and electric motor M, that is, on drive lines 14U, 14V, 14W, respectively. Semiconductor devices, namely N-channel MOSFETs in this example, are used for these phase relays 3U, 3V, 3W to cut off current supply from inverter circuit 1 to electric motor M. Furthermore, drivers 8U, 8V, 8W are provided for the respective phases so as to correspond to the respective phase relays 3U, 3V, 3W. The drain of each of MOSFETs that constitute phase relays 3U, 3V, 3W is connected to the side of inverter circuit 1, the source is connected to the side of electric motor M, and the gate is connected to each of drivers 8U, 8V, 8W. Parasitic diodes D7 to D9 are formed between the sources and drains of these MOSFETs, and the direction of parasitic diodes D7 to D9 is the forward direction from the side of electric motor M to the side of inverter circuit 1. The boosted power-supply voltage from booster circuit 9 is supplied to drivers 8U, 8V, 8W, and a control signal is supplied to the gate of each MOSFET through each of control lines (first control lines) 16U, 16V, 16W based on control by microcomputer 6, to drive phase relays 3U, 3V, 3W individually (on and off control).

For each phase, an active clamp circuit (first active clamp circuit) 10U, 10V, 10W is connected between the output terminal (control line 16U, 16V, 16W) of each driver 8U, 8V, 8W and drive line 11U, 11V, 11W between inverter circuit 1 and phase relay 3U, 3V, 3W, respectively. In other words, the gate and drain of each of MOSFETs that constitute phase relays 3U, 3V, 3W are connected by active clamp circuit 10U, 10y, 10W, that is, the side of driver 8U, 8V, 8W and the side of inverter circuit 1 are connected by active clamp circuit 10U, 10V, 10W, respectively. Active clamp circuits 10U, 10y, 10W have a back-to-back structure in which the anode is commonly connected to two Zener diodes ZD1 and ZD2, ZD3 and ZD4, ZD5 and ZD6, respectively.

In the above configuration, when an ignition switch IG is turned on, the operating power is supplied from power supply IC 5 to microcomputer 6, and the power-supply voltage is supplied to booster circuit 9. The power-supply voltage boosted by booster circuit 9 is supplied to H-side drivers 2UH, 2VH, 2WH, L-side drivers 2UL, 2VL, 2WL of inverter driver circuit 2, and drivers 7a, 7b, and 8U, 8V, 8W, respectively.

Microcomputer 6 controls drivers 7a, 7b to supply the control signal to the gate of each of MOSFETs that constitute powering cutoff relay 4a and regeneration cutoff relay 4b to perform on and off control. Furthermore, for example, a pulse-width modulated signal (PWM signal) is output from microcomputer 6 to inverter driver circuit 2. Based on this PWM signal, each of H-side drivers 2UH, 2VH, 2WH and L-side drivers 2UL, 2VL, 2WL in inverter driver circuit 2 supplies a drive signal based on the PWM signal to the gate of each of MOSFETs 1UH, 1VH, 1WH, 1UL, 1VL, 1WL in inverter circuit 1 to perform on and off control selectively.

Furthermore, microcomputer 6 controls drivers 8U, 8V, 8W to supply a control signal from these drivers 8U, 8V, 8W to the gate of each of MOSFETs that constitute phase relays 3U, 3V, 3W mentioned above to perform on and off control.

Then, when electric motor M is driven, each of MOSFETs that constitute powering cutoff relay 4a and regeneration cutoff relay 4b is turned on, and each of MOSFETs that constitute phase relays 3U, 3V, 3W is turned on. Furthermore, on and off control is selectively performed on each of MOSFETs 1UH, 1VH, 1WH, 1 UL, 1VL, 1WL of inverter circuit 1 to drive the three phases of electric motor M through drive lines 14U, 14V, 14W. In this case, the duty of the PWM signal is made variable as necessary to control the output torque of electric motor M to thereby change the assist force.

When a failure leading to electric brake is detected by microcomputer 6, for example, in a case of a short-circuit failure of at least one of MOSFETs 1UH, 1UL, 1VH, 1VL, 1WH, 1WL of inverter circuit 1, each of MOSFETs that constitute powering cutoff relay 4a and regeneration cutoff relay 4b is turned off to cut off power supply, and each of MOSFETs that constitute phase relays 3U, 3V, 3W is turned off by driver 8U, 8V, 8W to cut off inflow and outflow of current from inverter circuit 1 to electric motor M. This forces electric motor M to stop, and cuts off a current path generated by induced voltage when electric motor M rotates, that is, cuts off a closed loop to suppress the generation of electric brake.

Here, when any one of MOSFETs on the upper arm side (MOSFETs 1UH, 1VH, 1WH) among MOSFETs 1UH, 1UL, 1VH, 1VL, 1WH, 1WL of inverter circuit 1 is broken down, phase relay (3U, 3V, 3W) of the faulty phase is turned off, so that fail-safe control for controlling the drive of electric motor M can be performed using each of the remaining normal phases.

Thus, even when a failure leading to electric brake occurs, the drive of electric motor M can be continued to generate an assist force while suppressing the generation of electric brake.

Since the faulty phase is cut off and the drive of the electric motor is controlled using the normal two phases, there is a possibility that the assist force is decreased or steering performance is decreased compared with a case in which all phases are normal. However, driving performance can be improved compared with a case in which electric motor M is stopped to lose the assist force.

Furthermore, the embodiment has the three-phase drive configuration; however, the electric motor can also be configured to add a phase used in an abnormal state to control the drive of the electric motor using the normal phases and the added phase to thereby generate the assist force similar to that in a normal state.

<Protective Operation at the Time of Phase Cutoff>

Next, operation when a failure leading to electric brake is detected by microcomputer 6 to perform phase cutoff from the driving state of electric motor M will be described in detail. When each of MOSFETs that constitute phase relays 3U, 3V, 3W is turned off in an energizing state, high negative surge voltage is generated by a reverse electromotive force generated from the inductance of electric motor M. Here, description will be made on the assumption that a negative surge voltage, e.g., of −40 [V], is applied to the source of an MOSFET that constitutes phase relay 3U.

When no active clamp circuit 10U is included, since the MOSFET has gate capacitance, gate potential Vg changes, by the surge voltage applied to the source, from 0[V] up to the same potential as the source potential Vs (=−40V). Therefore, the MOSFET that constitutes phase relay 3U remains in an off state to make the drain-source potential difference become −40 [V], and hence there is a possibility that the MOSFET is broken down in excess of withstand voltage.

On the other hand, since active clamp circuit 10U is provided in the embodiment, the gate potential Vg is clamped by breakdown voltage −Vz of Zener diode ZD1 without changing up to the same potential as the source potential Vs(=−40V). This makes the gate-source potential difference become 40−Vz[V] to turn on the MOSFET that constitutes phase relay 3U.

Note that the breakdown voltage Vz of Zener diode ZD1 is voltage lower than the withstand voltage of the MOSFET, and it is preferred to set the breakdown voltage Vz to a voltage level at which the MOSFET is turned on.

Thus, phase relay 3U is turned on before the application of excessive negative surge voltage in excess of the withstand voltage of the MOSFET to make the potential difference small, so that a failure such as the breakdown of the MOSFET can be suppressed. When the surge voltage is low, since the MOSFET that constitutes phase relay 3U maintains the off state, the generation of electric brake can be suppressed.

The same applies to a case in which high negative surge voltage is applied to each of MOSFETs that constitute phase relays 3V, 3W. In this case, corresponding phase relay 3V or 3W is turned on to eliminate the potential difference, so that a failure such as the breakdown of the MOSFET can be suppressed.

When positive surge voltage is applied to phase relay 3U, 3V, 3W from electric motor M, current flows from the source of the MOSFET into the drain side through parasitic diodes D7 to D9. Thus, no large potential difference is applied to MOSFETs that constitute phase relays 3U, 3V, 3W.

<Protective Operation from Electromotive Force of Electric Motor by External Force>

In a phase cutoff state and a state in which each of MOSFETs that constitute phase relays 3U, 3V, 3W is off, even if an external force is applied due to a steering operation, driving over a curb, or the like to rotate electric motor M to thereby switch to a power generation mode, the same protection as that from surge voltage can be performed. In other words, when the external force is large (when electric motor M rotates at high speed) and a great negative electromotive force from electric motor M is generated, MOSFETs that constitute phase relays 3U, 3V, 3W are turned on by active clamp circuits 10U, 10V, 10W to perform protective operation.

On the other hand, when the external force is small (when the electric motor rotates at low speed) and the electromotive force is low, since active clamp circuits 10U, 10V, 10W do not operate and the MOSFETs remain in the off state, electric brake can be suppressed.

Thus, both the effect of protecting MOSFETs that constitute phase relays 3U, 3V, 3W from excessive surge voltage and the effect of suppressing the generation of electric brake from low surge voltage at which there is no possibility of breakdown, the MOSFETs can be satisfied at a high level.

When a positive electromotive force is applied from electric motor M to phase relays 3U, 3V, 3W, current flows from the sources of the MOSFETs into the drain side through parasitic diodes D7 to D9. Thus, no large potential difference is applied to the MOSFETs that constitute phase relays 3U, 3V, 3W.

<Effect of Expanding Controllable Range>

As described above, even if the applied surge voltage is high, phase relays 3U, 3V, 3W can be protected. Therefore, when a failure leading to electric brake is detected, the timing of turning off phase relay 3U, 3V, 3W can be hastened and hence electric brake can be effectively suppressed.

Hastening the timing of turning off phase relays means that at least a phase relay of a faulty phase can be turned off even in a state in which surge voltage is generated, that is, even in a state in which excessive current is generated, and thus, it is possible to expand the controllable range.

<Cost-Saving Effect>

Since three pairs of back-to-back Zener diodes only have to be provided in active clamp circuits 10U, 10y, 10W, respectively, an increase in cost due to an increase in the number of parts can be reduced.

<Effect of Performing Fail-Safe Control>

When at least any one of MOSFETs on the upper arm side (MOSFETs 1UH, 1VH, 1WH) among MOSFETs 1UH, 1UL, 1VH, 1VL, 1WH, 1WL of inverter circuit 1 is broken down, phase relay (3U, 3V, or 3W) of the faulty phase is turned off, so that fail-safe control for controlling the drive of electric motor M can be performed using each of the remaining normal phases.

Thus, even when a failure leading to electric brake occurs, the drive of electric motor M can be continued to generate an assist force while suppressing the generation of electric brake.

Since the faulty phase is cut off and the drive of the electric motor is controlled using the normal two phases, there is a possibility that the assist force is decreased or steering performance is decreased compared with a case in which all phases are normal. However, driving performance can be improved compared with a case in which electric motor M is stopped to lose the assist force.

Furthermore, the embodiment has the three-phase drive configuration; however, the electric motor can also be configured to add a phase used in an abnormal state to control the drive of the electric motor using the normal phases and the added phase to thereby generate the assist force similar to that in a normal state.

Furthermore, drivers 8U, 8V, 8W are provided for respective phases in the embodiment; however, a packaged device with respective phase driver functions integrated therein may be used to control the phase relays.

According to the above-mentioned configuration, when a failure leading to electric brake is detected to turn off a phase relay (semiconductor relay), it is possible to suppress that surge voltage generated by the inductance of the electric motor along with turning off the phase relay, is applied in excess of the withstand voltage of the semiconductor device.

Furthermore, in the phase cutoff state, when the electric motor is rotated by an external force due to a reaction force from the wheel side or a steering operation to generate an excessive electromotive force, the phase relay is turned on, so that a breakdown due to the excessive electromotive force in excess of the withstand voltage or the like can be suppressed. When the electromotive force is small, it is possible to suppress the generation of electric brake by maintaining the off state of the phase relay.

Thus, the generation of electric brake can be suppressed while protecting the semiconductor relay from excessive surge voltage.

Second Embodiment

In the first embodiment described above, drivers 8U, 8V, 8W respectively corresponding to phase relays 3U, 3V, 3W are provided. In contrast, in a second embodiment illustrated in FIG. 3, phase relays 3U, 3V, 3W are simultaneously controlled by one discrete driver 8 through a control line 16.

As described above, since active clamp circuits 10U, 10V, 10W are provided, phase relays 3U, 3V, 3W can be turned off, that is, of which phases can be cut off, irrespective of the magnitude of phase current. Therefore, there is no need to consider the timing of cutting off of each phase current, and it is possible to turn off phase relays 3U, 3V, 3W by one driver 8 at the same time.

Figure 3:
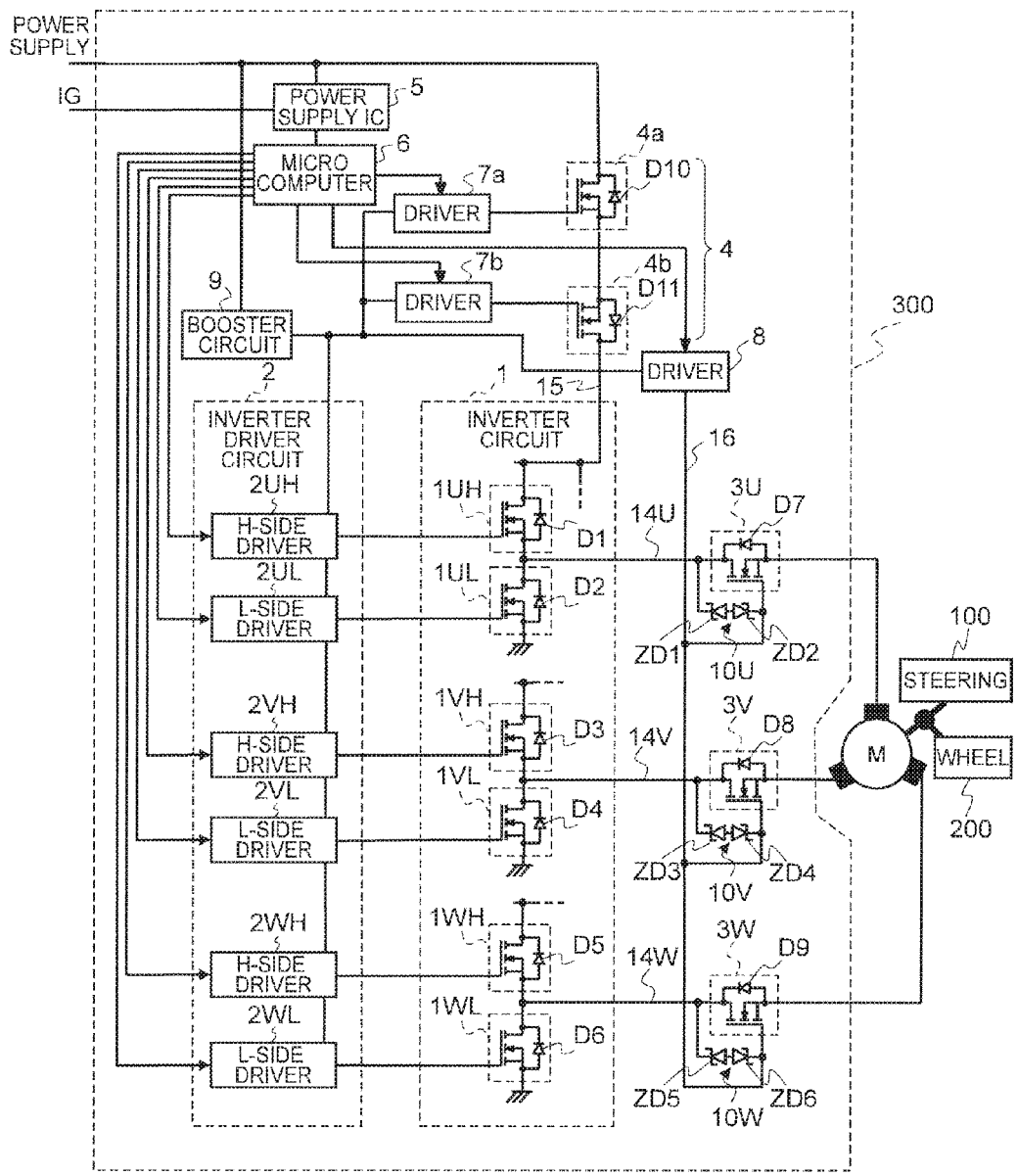
FIG. 3 is a circuit diagram illustrating a drive control apparatus for an electric motor according to a second embodiment of the present invention.

Since the other basic circuit configuration is the same as in FIG. 2, the same components as those in FIG. 2 are given the same reference numerals in FIG. 3 and detailed explanation thereof is omitted.

In the second embodiment, since driver 8 is shared among respective phase relays 3U, 3V, 3W, the circuit can be simplified, and this can also contribute to the cost reduction of control unit 300.

Third Embodiment

Figure 4:
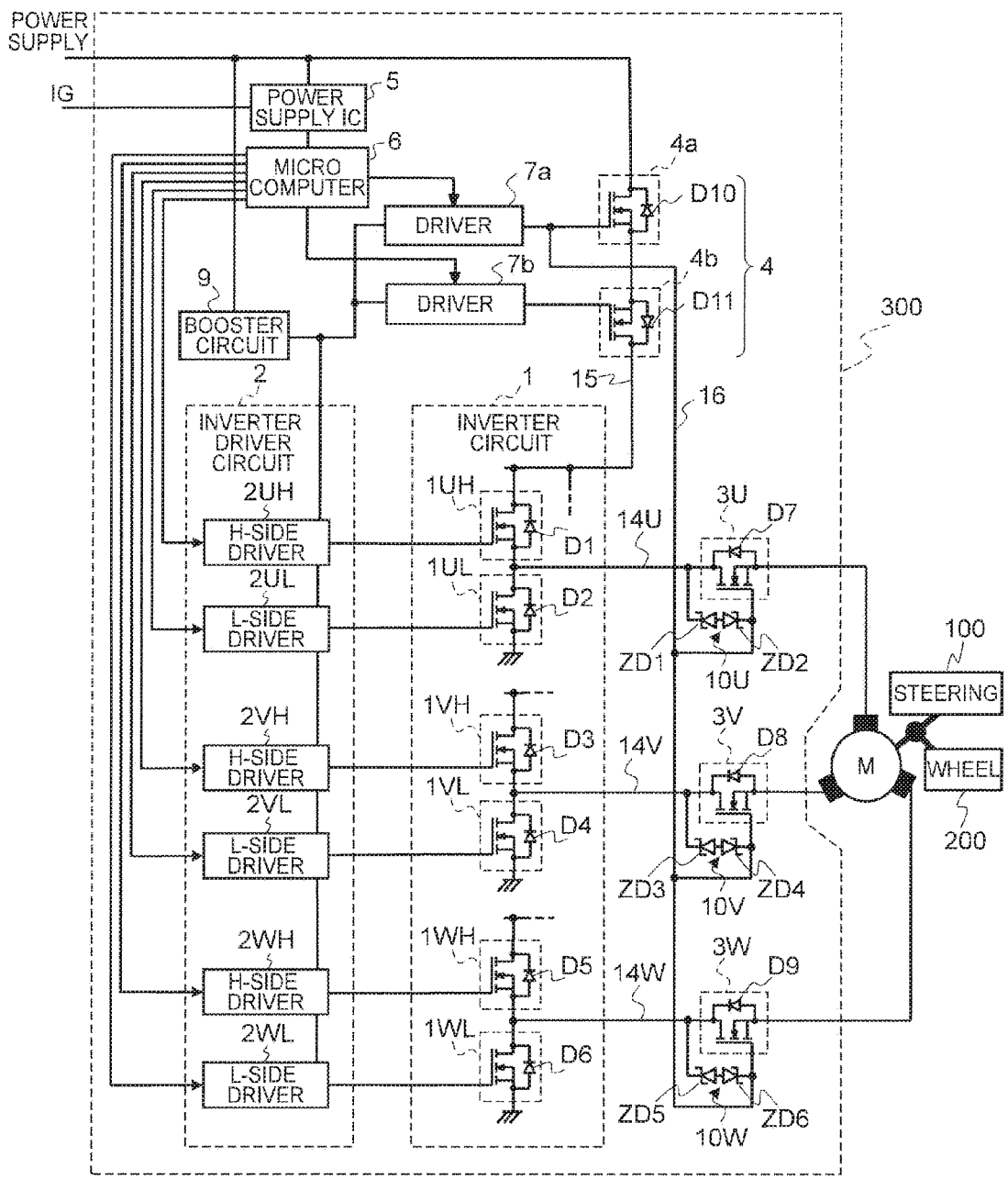
FIG. 4 is a circuit diagram illustrating a drive control apparatus for an electric motor according to a third embodiment of the present invention.

In the second embodiment described above, phase relays 3U, 3V, 3W are simultaneously controlled by driver 8, whereas in a third embodiment illustrated in FIG. 4, powering cutoff relay 4a and phase relays 3U, 3V, 3W are controlled by a driver 7a.

Powering cutoff relay 4a and phase relays 3U, 3V, 3W perform on and off action during the drive of electric motor M and during suppression of electric brake basically in the same manner. Furthermore, since active clamp circuits 10U, 10V, 10W are provided, phase relays 3U, 3V, 3W can be turned off irrespective of the magnitude of phase current. Thus, powering cutoff relay 4a and phase relays 3U, 3V, 3W can be controlled by driver 7a at the same time.

Since the other basic circuit configuration is the same as in FIG. 2 and FIG. 3, the same components as those in FIG. 2 and FIG. 3 are given the same reference numerals in FIG. 4 to omit the detailed description thereof.

According to such a configuration, since driver 7a can be shared between powering cutoff relay 4a and phase relays 3U, 3V, 3W, the circuit can be more simplified than that in the second embodiment, and this can contribute to the cost reduction of control unit 300.

Fourth Embodiment

Figure 5:
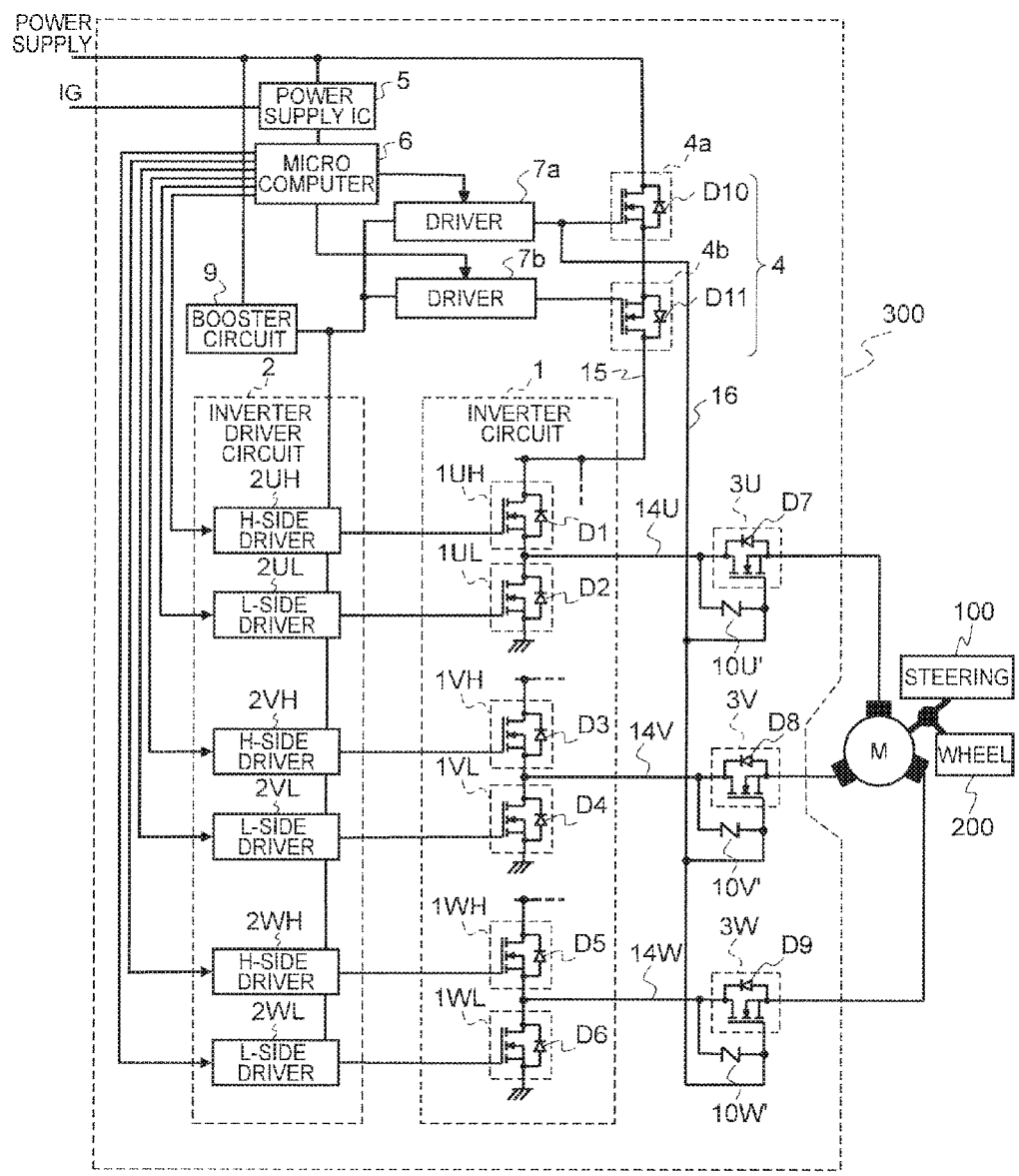
FIG. 5 is a circuit diagram illustrating a drive control apparatus for an electric motor according to a fourth embodiment of the present invention.

A fourth embodiment illustrated in FIG. 5 features that active clamp circuits in the third embodiment are composed of varistors 10U', 10V', 10W' As voltage at both ends of each varistor 10U', 10V', 10W' increases, resistance decreases rapidly. Therefore, similar to the case in which Zener diodes ZD1 to ZD6 are used, it is possible to suppress the generation of electric brake when applied voltage is low, while protecting, from excessive surge voltage, MOSFETs that constitute phase relays 3U, 3V, 3W.

Since the other basic circuit configuration is the same as in FIG. 4, the same components as those in FIG. 4 are given the same reference numerals in FIG. 5 and detailed explanation thereof is omitted.

Even in such a configuration, substantially the same operations and effects as those in the third embodiment can be obtained. Of course, varistors may also be used instead of the Zener diodes for the active clamp circuits in the first and second embodiments.

Fifth Embodiment

Figure 6:
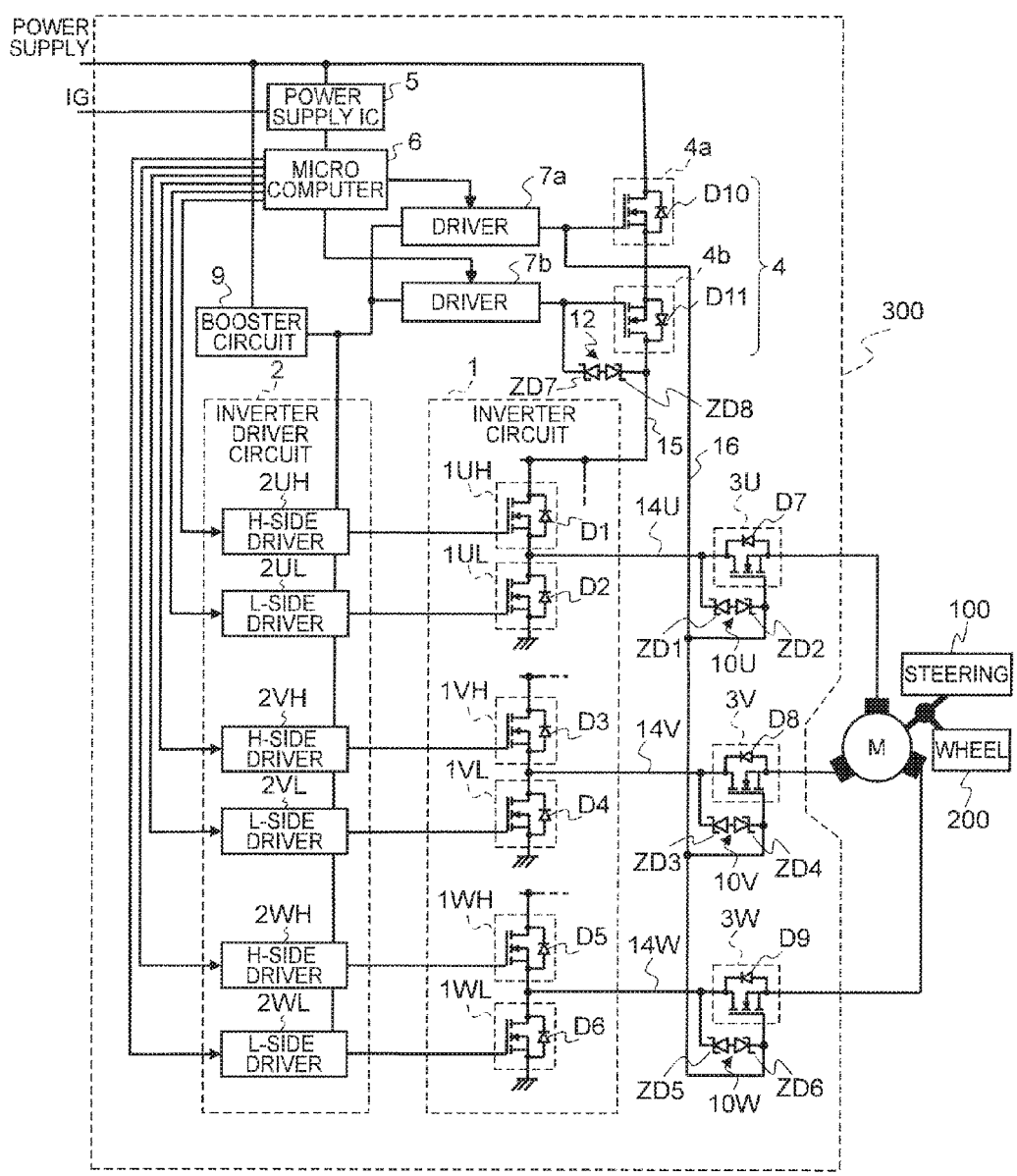
FIG. 6 is a circuit diagram illustrating a drive control apparatus for an electric motor according to a fifth embodiment of the present invention.

In a fifth embodiment illustrated in FIG. 6, an active clamp circuit 12 is provided for regeneration cutoff relay 4b in the third embodiment described above. Active clamp circuit 12 is connected to a point between a control line (second control line) of driver 7b and power supply line 15 of inverter circuit 1, that is, between the gate and drain of the MOSFET that constitutes regeneration cutoff relay 4b.

In the above configuration, when excessive positive surge voltage or great positive electromotive force is applied from electric motor M, for example, to phase relay 3U at the time of phase cutoff, the potential of power supply line 15 rises through parasitic diodes D7 and D1. Then, when the potential of power supply line 15 (the drain side of the MOSFET that constitutes regeneration cutoff relay 4b) is higher than breakdown voltage of Zener diode ZD8 in active clamp circuit 12, the potential of the control line of driver 7b rises to turn on the MOSFET that constitutes regeneration cutoff relay 4b.

Therefore, it is possible to guide the surge voltage or the electromotive force to a battery through parasitic diode D10 of the MOSFET that constitutes powering cutoff relay 4a to thereby protect the MOSFET that constitutes regeneration cutoff relay 4b.

The same applies to a case in which the excessive positive surge voltage or the great positive electromotive force is applied to each of MOSFETs that constitute phase relays 3V and 3W.

Since the other basic circuit configuration is the same as in the third embodiment, the same components as those in FIG. 4 are given the same reference numerals in FIG. 6 to omit the detailed description thereof.

According to such a configuration, it is possible to protect not only MOSFETs that constitute phase relays 3U, 3V, 3W, but also regeneration cutoff relay 4b when the excessive positive surge voltage or the large positive electromotive force is applied.

Sixth Embodiment

Figure 7:
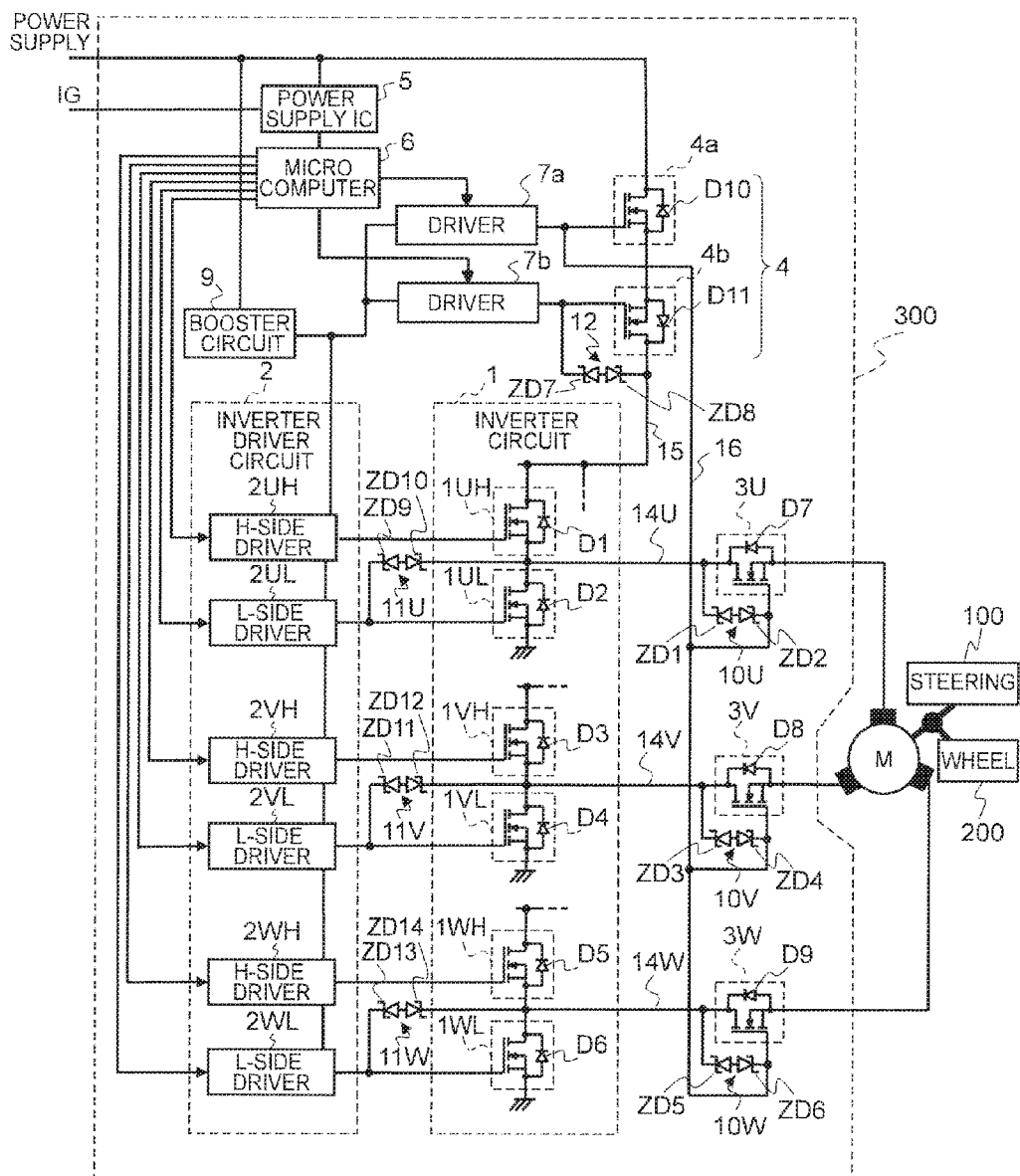
FIG. 7 is a circuit diagram illustrating a drive control apparatus for an electric motor according to a sixth embodiment of the present invention.

In a sixth embodiment illustrated in FIG. 7, active clamp circuits 11U, 11V, 11W is provided for downstream side MOSFETs (downstream drive devices) 1UL, 1VL, 1WL of inverter circuit 1 in addition to phase relays 3U, 3V, 3W and regeneration cutoff relay 4b in the fifth embodiment described above.

In other words, active clamp circuits 11U, 11V, 11W are connected, respectively for each phase, to the output terminal (third control line) of L-side driver 2UL and a common connection point (upstream line of a downstream drive device) between MOSFETs 1UH and 1UL, to the output terminal (third control line) of L-side driver 2VL and a common connection point between MOSFETs 1VH and 1VL, and to the output terminal (third control line) of L-side driver 2WL and a common connection point between MOSFETs 1WH and 1WL. In other words, each of active clamp circuits 11U, 11V, 11W is connected to a point between the drain and gate of each of ground-side MOSFETs 1UL, 1VL, 1WL of inverter circuit 1.

In the above configuration, when excessive positive surge voltage or an excessive positive electromotive force is applied from electric motor M, for example, to phase relay 3U at the time of phase cutoff, the potential of a drive line 14U between inverter circuit 1 and the phase relay rises through parasitic diode D7. Then, when the potential of drive line 14U is higher than breakdown voltage of Zener diode ZD10 in active clamp circuit 11U, the potential of the control line of MOSFET 1UL rises to turn it on. Therefore, it is possible to guide the excessive surge voltage or the excessive electromotive force to a ground point to thereby protect MOSFET 1UL.

Furthermore, the drain potential of the MOSFET that constitutes regeneration cutoff relay 4b rises through parasitic diode D1 of MOSFET 1UH and power supply line 15. When this potential exceeds the breakdown voltage of Zener diode ZD8 in active clamp circuit 12, the potential of the control line of regeneration cutoff relay 4b rises to turn it on, so that it is possible to guide the surge voltage to the power supply through parasitic diode D10 of the MOSFET that constitutes powering cutoff relay 4a to thereby protect the MOSFET.

The same applies to a case in which the excessive positive surge voltage or the excessive electromotive force is applied to each of MOSFETs that constitute phase relays 3V, 3W. In this case, corresponding MOSFET 1VL or 1WL is turned on to make the potential difference small, so that MOSFET 1VL or 1WL can be protected.

Since the other basic circuit configuration is the same as in FIG. 6, the same components as those in FIG. 6 are given the same reference numerals in FIG. 7 to omit the detailed description thereof.

According to such a configuration, even when the inverter circuit 1 is stopped, it is possible to lead the surge voltage to the ground by turning on MOSFETs 1UL, 1VL, 1WL (downstream side drive devices). Thus, it is possible to protect not only MOSFETs that constitute phase relays 3U, 3V, 3W from excessive surge voltage, but also regeneration cutoff relay 4b, and to suppress the applying of high voltage to MOSFETs that constitute inverter circuit 1.

Note that active clamp circuit 12 is not an essential component in the sixth embodiment, and it may be provided only when the withstand voltage of regeneration cutoff relay 4b is low or when a high protective effect is required.

Seventh Embodiment

Figure 8:
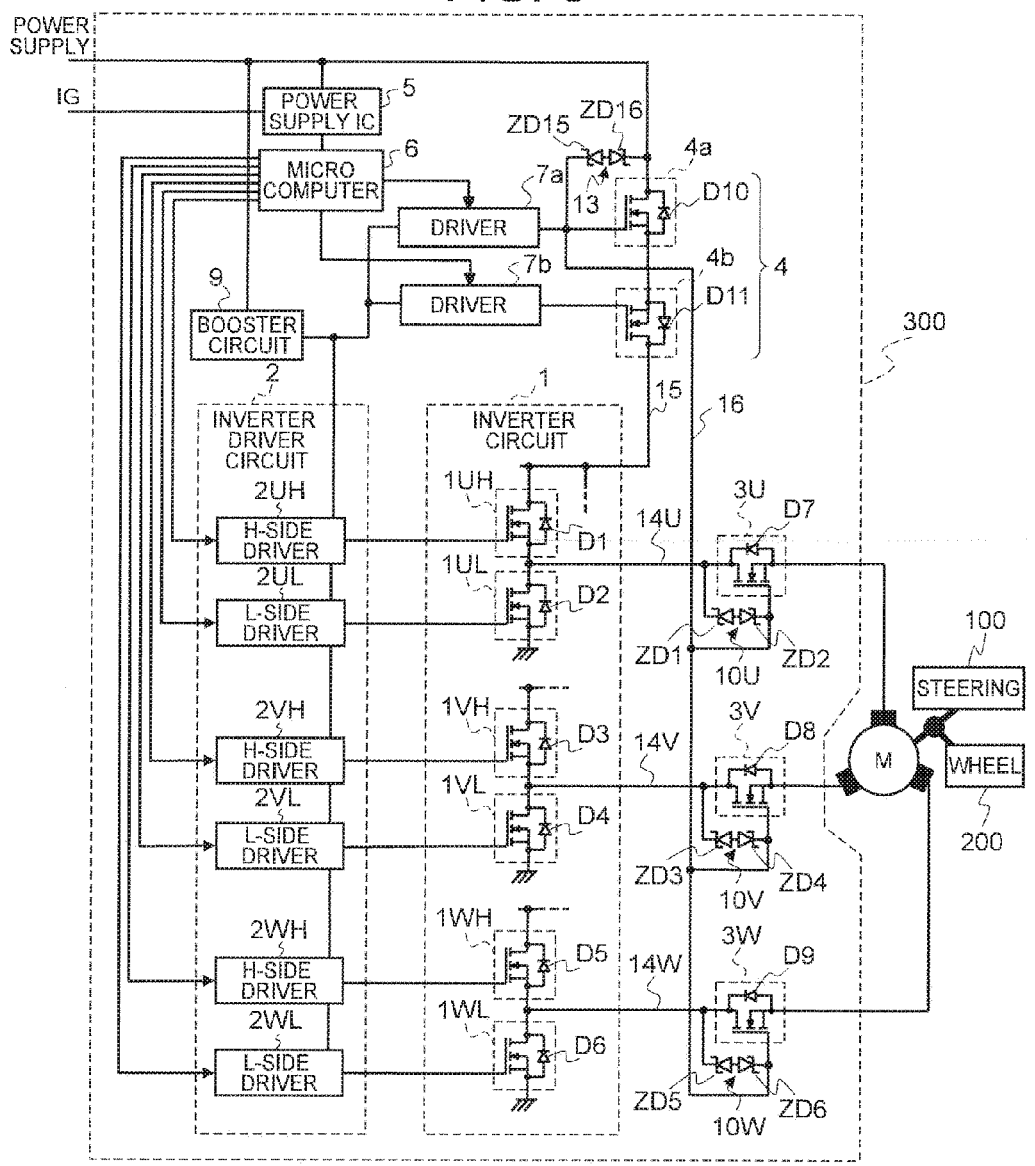
FIG. 8 is a circuit diagram illustrating a drive control apparatus for an electric motor according to a seventh embodiment of the present invention.

In a seventh embodiment illustrated in FIG. 8, an active clamp circuit 13 is provided for powering cutoff relay 4a in the third embodiment described above. Active clamp circuit 13 is connected to a point between the control line of driver 7a and the power supply line, that is, between the gate and drain of the MOSFET that constitutes powering cutoff relay 4a.

In the above configuration, when excessive negative surge voltage is applied from electric motor M, for example, to phase relay 3U at the time of phase cutoff, the MOSFET of phase relay 3U is turned on by active clamp circuit 10U. In this case, the potential of control line 16 is lowered through active clamp circuit 10U to lower the gate potential of the MOSFET that constitutes powering cutoff relay 4a. This lowered gate potential of the MOSFET makes the potential difference between both ends of active clamp circuit 13 large. Then, when the potential exceeds the breakdown voltage of Zener diode ZD16, the potential of the control line of powering cutoff relay 4a rises to turn it on, so that the MOSFET that constitutes powering cutoff relay 4a can be protected.

Since the other basic circuit configuration is the same as in FIG. 6, the same components as those in FIG. 6 are given the same reference numerals in FIG. 8 and detailed description thereof is omitted.

According to such a configuration, it is possible to protect not only MOSFETs that constitute phase relays 3U, 3V, 3W from excessive surge voltage, but also powering cutoff relay 4a when a protective operation is performed on excessive negative surge voltage. The same applies to a case in which negative voltage is applied by the electromotive force of electric motor M at the time of phase cutoff to perform the protective operation.

[Variations]

Figure 9:
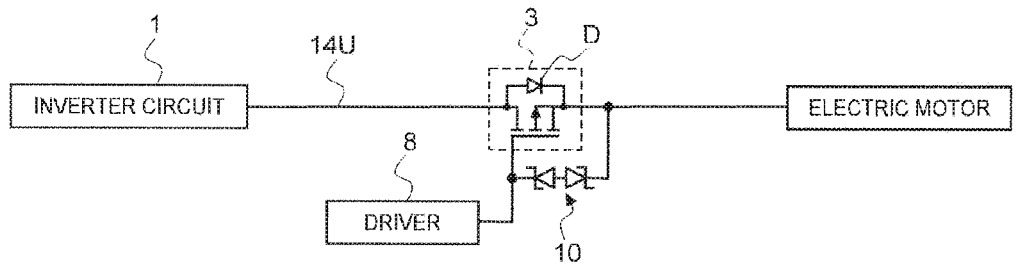
FIG. 9 is a circuit diagram for explaining a variation of the present invention.

In the first to seventh embodiments described above, phase relays 3U, 3V, 3W are N-channel MOSFETs, and active clamp circuits 10U, 10y, 10W are connected to the side of drivers 8U, 8V, 8W of phase relays 3U, 3V, 3W and the side of inverter circuit 1, respectively. However, the present invention is not limited to this configuration. As shown in FIG. 9, even when phase relay 3 is a P-channel MOSFET and active clamp circuit 10 is configured to connect the electric motor M side and the driver 8 side of phase relay 3, the same effect as that in each of the embodiments can be obtained.

Furthermore, the configuration may be such that phase relay 3 is a P-channel MOSFET, active clamp circuit 10 connects the electric motor M side and the driver 8 side of phase relay 3, and driver 8 is provided for each phase relay 3 similar to the first embodiment. In such a configuration, when any one of MOSFETs on the lower arm side (1UL, 1VL, 1WL) among MOSFETs 1UH, 1UL, 1VH, 1VL, 1WH, 1WL of inverter circuit 1 breaks down, phase relay (3U, 3V, 3W) of the faulty phase is turned off, so that fail-safe control for controlling the drive of electric motor M can be performed using each of the remaining normal phases. Thus, even when a failure leading to electric brake occurs, the drive of electric motor M can be continued while suppressing the generation of electric brake to generate an assist force.

In each of the embodiments, the active clamp circuits are described by taking, as an example, the back-to-back connection of Zener diodes and varistors; however, the present invention is not limited thereto. Any other configuration may be used as long as the active clamp circuits are circuits or devices capable of being turned on and off when the potential difference is large.

Furthermore, the description is made by taking, as an example, MOSFETs as semiconductor devices that constitute semiconductor relays; however, the present invention can also be applied to a controller in which any other semiconductor devices, such as bipolar transistors or IGBTs, is used in a phase relay, an inverter circuit, and a power supply relay.

Furthermore, in each of the embodiments, the description is made by taking the electric power steering system as an example; however, the present invention is not limited to the electric power steering system, and can be applied to various drive control apparatuses for an electric motor. For example, the present invention can also be applied to an electric motor apparatus for seat belts, an electric motor apparatus for a vehicle, such as for a brake.

REFERENCE SYMBOL LIST

M electric motor
1 inverter circuit
2 inverter driver circuit
3, 3U, 3V, 3W phase relay
4 power supply relay
4a powering cutoff relay
4b regeneration cutoff relay
7a, 7b, 8, 8U, 8V, 8W driver
10U, 10V, 10W, 11U, 11V, 11W, 12, 13 active clamp circuit
14U, 14V, 14W drive line
15 power supply line
16, 16U, 16V, 16W control line
100 steering wheel
200 wheel
300 control unit

The invention claimed is:

1. A drive control apparatus for an electric motor, which controls drive of the electric motor, comprising:
   a drive circuit configured to control the drive of the electric motor;
   a first phase cutoff semiconductor relay arranged for each phase on a drive line between the drive circuit and the electric motor and configured to cut off current supply from the drive circuit to the electric motor;
   a power supply relay arranged on a power supply line for power supply to the drive circuit configured to control supply and cutoff of power to the drive circuit, the power supply relay including a second powering cutoff semiconductor relay and a third regeneration cutoff semiconductor relay connected in series, the second powering cutoff semiconductor relay comprising a parasitic diode that permits forward flow in an electric-motor-to-power-supply direction, the third regeneration semiconductor relay comprising a parasitic diode that permits forward flow in a power-supply-to-electric-motor direction;
   a first driver configured to drive the first phase cutoff semiconductor relay for each phase of the electric motor or simultaneously drive the first phase cutoff semiconductor relay for the phases to perform phase cutoff, the first driver further configured to drive the second powering cutoff semiconductor relay;
   a second driver configured to drive the third regeneration semiconductor relay; and
   a first active clamp circuit configured to turn on the first semiconductor relay when the electric motor is rotated by an external force and a potential difference between the drive circuit side and the electric motor side of the first semiconductor relay is greater than or equal to a predetermined value, even when the first phase cutoff semiconductor relay and the second powering cutoff semiconductor relay are set by the first driver to be in a cutoff state.

2. The drive control apparatus for the electric motor according to claim 1, further comprising a second active clamp circuit configured to turn on the second semiconductor relay when a potential difference between the drive circuit side and the power supply side of the second semiconductor relay is greater than or equal to a predetermined value.

3. The drive control apparatus for the electric motor according to claim 1, further comprising a third active clamp circuit configured to turn on the third semiconductor relay when a potential difference between the drive circuit side and the power supply side of the third semiconductor relay is greater than or equal to a predetermined value.

4. The drive control apparatus for the electric motor according to claim 1, wherein the drive circuit includes an inverter circuit to which power is supplied through the power supply relay, and an inverter driver circuit to which voltage obtained by boosting power-supply voltage is supplied to control the inverter circuit.

5. The drive control apparatus for the electric motor according to claim 4, wherein
the inverter circuit includes a downstream side drive device and an upstream side drive device for each drive line, and
the drive control apparatus further comprises a fourth active clamp circuit configured to turn on the downstream side drive device when a potential difference between an upstream line portion and a ground point of the downstream side drive device in the drive circuit is greater than or equal to a predetermined value.

6. The drive control apparatus for the electric motor according to claim 4, wherein the inverter driver circuit includes an H-side driver configured to control an upstream side drive device of the inverter circuit and an L-side driver configured to control a downstream side drive device of the inverter circuit.

7. The drive control apparatus for the electric motor according to claim 1, further comprising a microcomputer configured to control the drive circuit, the first driver and the second driver.

8. The drive control apparatus for the electric motor according to claim 7, further comprising a booster circuit configured to boost and supply power-supply voltage to the first driver, the drive circuit, and the second driver.

9. The drive control apparatus for the electric motor according to claim 1, wherein the first semiconductor relay includes any one of a MOSFET, a bipolar transistor, and an IGBT, and the first active clamp circuit includes Zener diodes connected in a back-to-back structure, or a varistor.

10. The drive control apparatus for the electric motor according to claim 1, wherein the second and the third semiconductor relays each include any one of a MOSFET, a bipolar transistor, and an IGBT.

11. The drive control apparatus for the electric motor according to claim 2, wherein the second active clamp circuit includes Zener diodes connected in a back-to-back structure, or a varistor.

12. The drive control apparatus for the electric motor according to claim 3, wherein the third active clamp circuit includes Zener diodes connected in a back-to-back structure or a varistor.

13. The drive control apparatus for the electric motor according to claim 5, wherein the fourth active clamp circuit includes Zener diodes connected in a back-to-back structure, or a varistor.

14. An electric power steering system for assisting in steering by a steering mechanism using an electric motor as a drive source, comprising
a drive control apparatus configured to control drive of the electric motor, wherein
the drive control apparatus includes:
a drive circuit configured to control the drive of the electric motor;
a first phase cutoff semiconductor relay arranged on a drive line between the drive circuit and the electric motor configured to cut off current supply from the drive circuit to the electric motor;
a power supply relay arranged on a power supply line for power supply to the drive circuit configured to control supply and cutoff of power to the drive circuit, the power supply relay including a second powering cutoff semiconductor relay and a third regeneration semiconductor relay connected in series, the second powering cutoff semiconductor relay comprising a parasitic diode that permits forward flow in an electric-motor-to-power-supply direction, the third regeneration semiconductor relay comprising a parasitic diode that permits forward flow in a power-supply-to-electric-motor direction;
a first driver configured to drive the first phase cutoff semiconductor relay for each phase of the electric motor or simultaneously drive the first phase cutoff semiconductor relay for the phases to perform phase cutoff, the first driver further configured to drive the second powering cutoff semiconductor relay;
a second driver configured to drive the third regeneration semiconductor relay; and
an active clamp circuit configured to turn on the semiconductor relay when the electric motor is rotated by an external force and a potential difference between the drive circuit side and the electric motor side of the first semiconductor relay is greater than or equal to a predetermined value, even when the first phase cutoff semiconductor relay and the second powering cutoff semiconductor relay are set by the first driver to be in a cutoff state.

15. The electric power steering system according to claim 14, wherein the semiconductor relay includes any one of a MOSFET, a bipolar transistor, and an IGBT, and the active clamp circuit includes Zener diodes connected in a back-to-back structure, or a varistor.

* * * * *